July 17, 1928.
C. G. CRONWALL
1,677,584
ADJUSTABLE SEAT STRUCTURE FOR AUTOMOBILES
Filed June 30, 1927  3 Sheets-Sheet 1
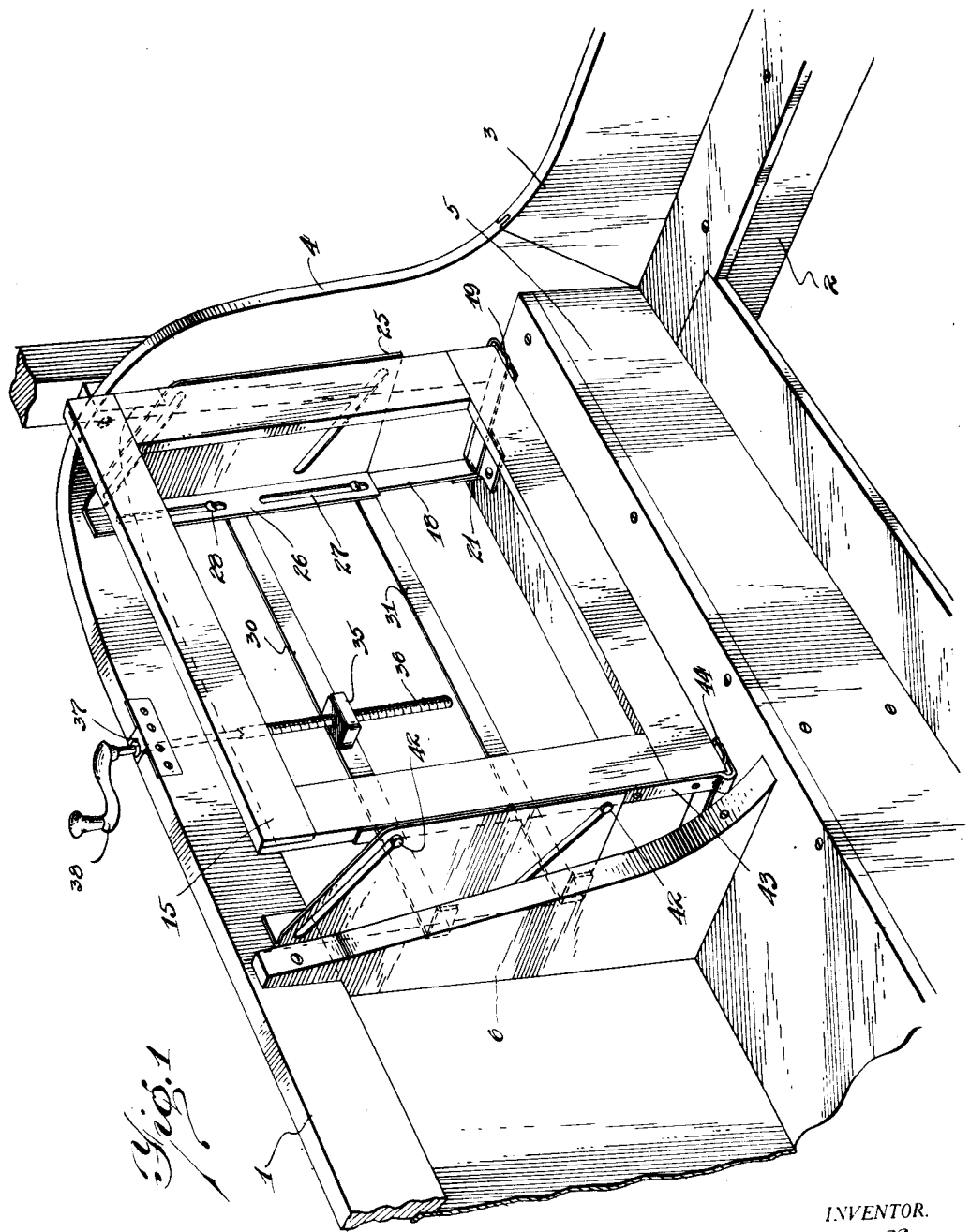
INVENTOR.
Carl G. Cronwall
BY
ATTORNEY.

July 17, 1928.  1,677,584
C. G. CRONWALL
ADJUSTABLE SEAT STRUCTURE FOR AUTOMOBILES
Filed June 30, 1927   3 Sheets-Sheet 2
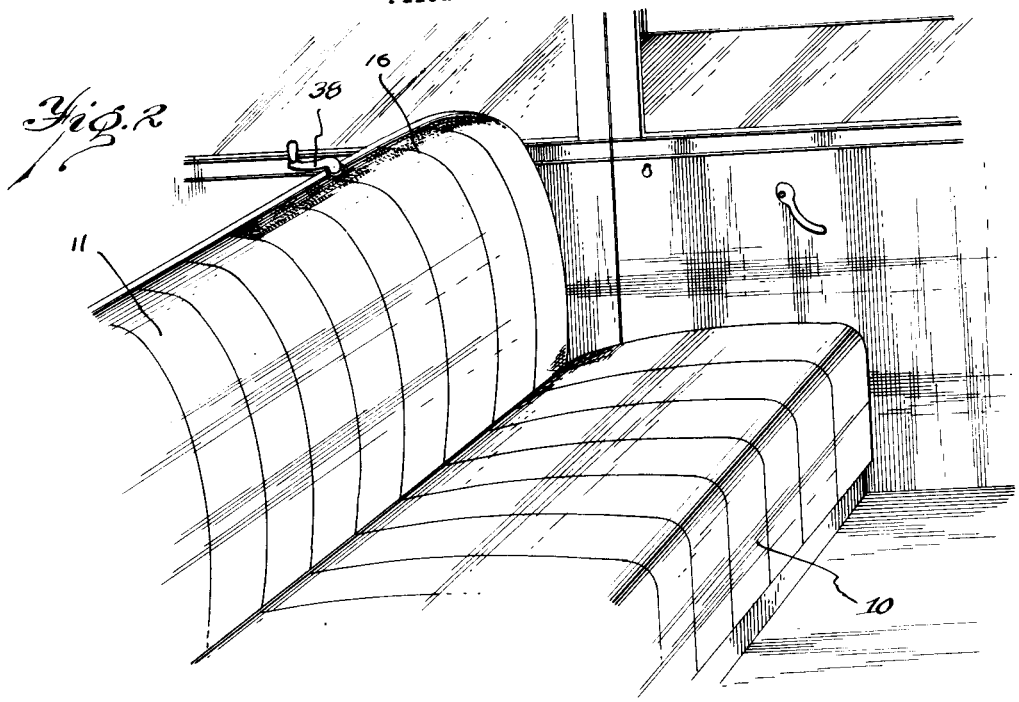
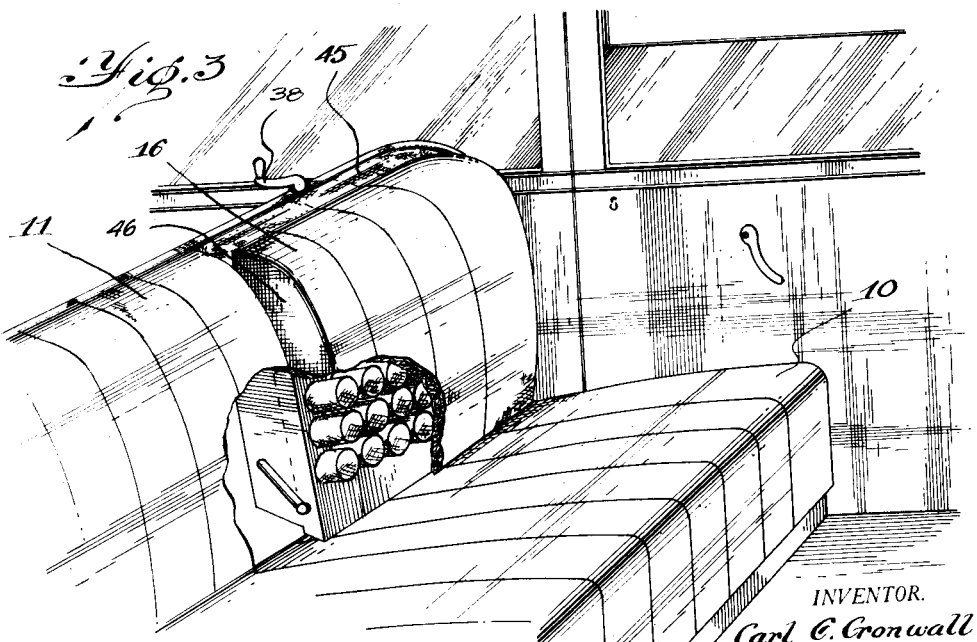
INVENTOR.
Carl C. Cronwall
BY
ATTORNEY.

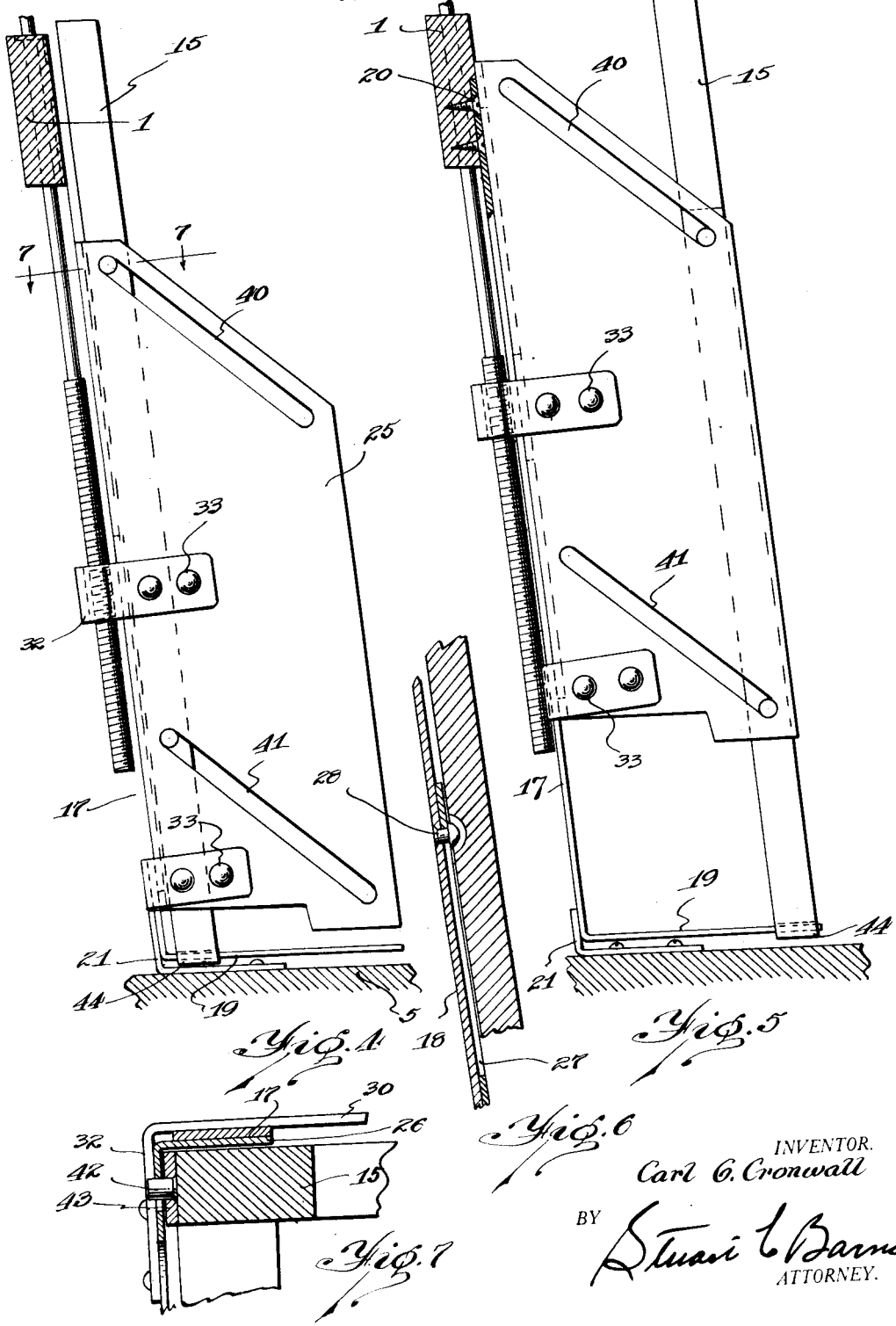

Patented July 17, 1928.

1,677,584

UNITED STATES PATENT OFFICE.

CARL G. CRONWALL, OF DETROIT, MICHIGAN, ASSIGNOR TO GENERAL MOTORS CORPORATION, OF DETROIT, MICHIGAN, A CORPORATION OF DELAWARE.

ADJUSTABLE SEAT STRUCTURE FOR AUTOMOBILES.

Application filed June 30, 1927. Serial No. 202,512.

This invention relates to an adjustable seat structure for automobiles, which is especially useful for the driver of an automobile.

The desirability of an adjustable seat for the driver of an automobile has been heretofore appreciated, in order that the individual driver may make an adjustment according to his desires so that the clutch and brake pedals, accelerator, etc., can be operated to the best advantage. A number of adjustable seat arrangements have been proposed. In the type of automobile having but two doors with a full back seat, and individual rumble or foldable front seats, the adjustability of the driver's seat is not very difficult to obtain. It has been proposed to provide a set screw arrangement which constitutes a portion of the rear support for the seat, thus to determine the angle of inclination of the seat, and a similar set screw arrangement has been proposed for adjusting the angle of inclination of the back of the seat.

It has also been proposed to provide an adjustable seat wherein adjustable mechanism such as toggle levers or the like are interposed between a fixed part and the cushion, in a manner so that movement of the toggle levers move or adjust the cushion relative to the fixed part. This construction requires considerable space between the cushion and the fixed part for receiving the adjusting mechanism or levers. The cushion at the back of the seat is quite thick, especially in cars of a good grade where springs are used. Accordingly, a mechanism which requires considerable space to the rear of the cushion, in addition to the thickness of the cushion, is not practical from a commercial standpoint, because of the space that is wasted. This is especially true in the present day trend of automobiles which is toward a shorter wheel base and lower bodies, and in which every inch of space must be utilized to the very best advantage.

It has also been proposed to provide an adjustable seat wherein similar supporting and adjusting mechanism is visible and which projects or stands out from the general contour of the seat arrangement, and this is not only unsatisfactory as a commercial article but is undesirable from an æsthetic standpoint.

The present invention is devoted to the provision of an adjustable seat structure having an adjusting mechanism of such a nature, and of such an arrangement, that no space is required in addition to that employed by an ordinary seat. According to the invention the back of the seat is adjustable forwardly and rearwardly to suit the desires of the occupant. When the seat is in its rearward adjustment, the total space taken up by the seat is no greater than that of a non-adjustable seat. Some of the adjustable mechanism utilizes space which is also utilized by the thickness of the seat cushion, and other mechanism, such as the operating mechanism, or the mechanism by which adjustment is made occupies space in the seat frame and does not require any additional room.

The invention also contemplates an adjustable seat structure capable of meeting the exacting requirements incident to the use of the automobile. To this end the structure affords a seat structure readily and quickly adjustable, a structure not subject to objectionable rattling and which will positively stay in any adjusted position. Moreover, the invention contemplates a structure which has the secureness or fixedness of a solid seat construction as distinguished from an adjustable structure of a non-secure or wobbly adjustable construction, which of course is objectionable because of interference with the driver. Moreover, the invention contemplates a construction which will not interfere with the interior of the automobile from an æsthetic standpoint, it being understood that at the present time requirement as to the appearance of the interior of an automobile is exacting.

A seat structure built in accordance with the invention is shown in the accompanying drawings wherein:

Fig. 1 is a perspective view of a part of an automobile seat showing such seat provided with the adjustable back structure.

Figs. 2 and 3 are perspective views showing the adjustable back in two different positions with the covering material or trimming being partially cut away in Fig. 3.

Fig. 4 is a sectional view showing a side elevation of the adjustable portion.

Fig. 5 is a similar view showing the extreme outermost position of the adjustable portion.

Fig. 6 is a section taken vertically along the flanges 26 of Fig. 1.

Fig. 7 is a section taken on line 7—7 of Fig. 1 showing details of the construction.

In Fig. 1 the structure of a seat is shown, the upholstering being removed. The seat consists of a main back having a back member 1 and sills 2. The seat is defined by side boards 3 and 4 and near the back is a box-like structure 5. The back of the seat may be reinforced by the intermediate support 6. A cushioned seat 10, as shown in Figs. 2 and 3, is designed to rest upon the sills 2 and the rear end of the cushioned seat backs up against the boxing 5. The main back is to receive upholstering 11, the lower edge of which terminates just over the boxing 5.

In conjunction with the main back 1, which extends across the automobile body from side to side, is an ancillary seat back 15 arranged to be adjusted forwardly and rearwardly relative to the main back 1. As will be seen in Figs. 2 and 3 the upholstering 11 is fixed to the main back and is not adjustable. However the ancillary back is for the driver and this is adjustable. The ancillary back is upholstered, as at 16, and may include springs as shown in Fig. 3, and the back and its upholstering are adjustable together.

For the purpose of mounting the ancillary back to the main back, a pair of guide members 17 and 18 are provided which are in the nature of strap metal members; these guide members are bent, as at 19, to provide guiding members, the purpose of which will be presently brought out. The members are secured at their upper end to the frame member 1, as by means of screws, as shown at 20 in Fig. 5; while at their lower ends they are provided with angle members 21 which are screwed or otherwise suitably attached to the boxing 5.

A plate 25 is carried by each supporting member so as to reciprocate vertically with respect thereto. Each plate 25 is bent inwardly, as at 26, and provided with a pair of slots 27. The supporting members 17 and 18 each carry headed studs or rivets 28 which project through the slots. The two plates are connected together by members 30 and 31; the ends of these members are bent, as at 32, and secured to the plates by means of rivets or other suitable devices, as at 33. One of the cross members, as for instance the cross member 30, is provided with a block 35 which has internal screw threads. A screw shaft member 36 extends through the block and this screw member is fixedly mounted, as shown at 37, to the main back frame. The upper end of the screw shaft is provided with a suitable handle 38 for the rotation of the screw shaft.

With the structure thus far described, it will be observed that by rotating the screw shaft through means of the handle 38, the two plates are reciprocated vertically on the guiding members 17 and 18. It will be noted that the inwardly bent portions 26 of the plates face against the forward side of the guiding members 17 and 18, whereas the connecting strips 30 and 31 engage the rear sides of the guiding members so that the plates, while capable of reciprocation along the guide members, are held in true position with respect thereto and they can not tip forwardly or backwardly, or to the side. The manner in which the guide members are engaged both at front and rear sides, is shown in Fig. 7.

Each plate is provided with cam slots 40 and 41. The ancillary seat frame is provided with a pair of projecting studs 42 on each side which are received in the cam slots of the plates. The raising and lowering of the plates through the means of the screw effects a retracting or projecting of the ancillary seat frame. At each side the ancillary seat frame is provided with a metal facing 43. The facing may be in the form of strip metal and the lower ends are turned inwardly as at 44 and engage under the guide devices 19. The ancillary seat frame thus rests upon the guide devices 19, and the portions 44 engage under these guide devices. Thus, as the ancillary seat frame is retracted or projected it is positively guided in this movement by the guide devices 19. The full retracted and projected positions of the ancillary seat frame is shown in Figs. 4 and 5 respectively, and from these views it will be noted how the ancillary frame moves with respect to the guide devices 19.

The upholstering for the back is preferably divided, as shown at 11 and 16 in Figs. 3. The upholstering of both sections preferably covers the main seat frame so that when the ancillary seat is retracted the appearance is much the same as an ordinary fixed back with the exception of the operating handle. An excess of covering material, or trimming, such as velvet, mohair, or the like, is provided as at 45 and at 46. The material 45 covers the adjacent top portion of the main seat back, whereas the material 46 covers the plates at the sides of the ancillary seat frame. When the seat is retracted, as shown in Fig. 2, this excess material folds in the form of a plait or plaits between the main frame and the ancillary frame, whereas when the ancillary seat is fully projected the material becomes taut, Thus an adjustable seat back for the driver of the automobile is provided, and at the same time a single seat which extends from side to side of the automobile may be had. The seat cushion 10 may be of the usual type wide enough for two or three persons and the ancillary seat back is adjustable independently of the seat cushion and of the upholstering on the main seat back. However, the cushion can be divided if desired. Moreover, the manner in which the cam plates are guided in their vertical reciprocation and the manner in which the ancillary seat frame is guided in its horizontal or substantially horizontal reciprocation makes the ancillary seat back secure in any position of adjustment. In other words, the ancillary seat back can not rock or tip so that it provides a secure back rest for the driver. The construction is such that there are no loose operating parts which would be subject to rattle in the operation of the automobile, nor are there any parts upon which there is an excess amount of wear which would cause looseness or rattling after a long period of use. The operating screw and its handle are held in a fixed position on the main seat frame so that the screw is not subject to movement or rattle, and of course the operating handle can be of a design corresponding to the general scheme of hardware design used on the interior of the automobile.

It will be noted that the upholstery 16, of the cushion for the ancillary seat back is applied directly to the frame structure of this seat back without the interposition of any of the mechanism. The adjustable mechanism which consists of the plates with the cam slots and associated parts, are disposed at the sides of the cushion of the ancillary seat back. Thus when the ancillary seat back is retracted, the seat and adjustable mechanism telescope so to speak, with the plates extending along the sides of the ancillary seat. Thus the ancillary seat frame can directly abut against the main seat frame in its fully retracted position and in this position, the space required is substantially the same as that of a non-adjustable seat. The operating mechanism which consists of the handle, the screw shaft, and the interior threaded block, and associated parts lies within the frame of the main seat back, thus to utilize the space and without requiring the use of additional space. Some of the claims which are appended hereto make use of the terms "operating mechanism" and "adjustable mechanism"; the former includes the screw threaded shaft and associated parts, and the latter includes the plates with the cam slots and associated parts.

The invention has been described with particular reference to seats of the type which extend across the width of the automobile body. However, the invention is applicable to individual seats of a fixed nature such as the driver's seat found in what is ordinarily termed a four passenger coupé. This seat, while being an individual seat, is not of the foldable or rumble type, and in a four passenger coupé there is usually such a foldable or rumble seat at the side of the fixed driver's seat. Since foldable or rumble seats can be made adjustable in other ways it is not believed to be preferable to apply the invention to such seats although it can be applied if the occasion arises for doing so.

The word "longitudinally" used in some of the claims in referring to "longitudinal reciprocation of the ancillary seat back" means longitudinally of the vehicle.

I claim:

1. An automobile seat comprising in combination, a main seat back and a seat cushion, the seat back being stationary with respect to the automobile body, an ancillary seat back, adjustable mechanism for carrying back, adjustable mechanism whereby the same the ancillary seat back whereby the same can be projected or retracted relative to the main seat back, upholstery on the ancillary seat back including an excess of covering material which covers the top of the main seat back, said excess of covering material being adapted to be folded or extended as the ancillary seat is retracted or projected respectively, and a handle journaled in a fixed position in the main seat back and which is operably connected to the said adjustable mechanism.

2. An automobile seat comprising in combination, a main seat back extending across the width of the automobile, an ancillary seat back of substantially half the width of the main seat back, and of a height substantially corresponding to the height of the main seat back, adjustable mechanism upon which the ancillary seat back is carried whereby the ancillary seat back can be projected or retracted relative to the main seat back, an operating handle fixedly journaled back, an operating handle fixedly journaled in the main seat back, means connecting said handle to the said adjustable mechanism carrying the ancillary seat back whereby the ancillary seat back may be projected or retracted by operation of the handle while said handle remains in fixed position relative to the main seat back.

3. An automobile seat comprising in combination, a main seat back extending across the width of the automobile, upholstery fixedly carried by a portion of the main seat back, an ancillary seat back, adjustable mechanism connecting the ancillary seat back to the main back whereby the ancillary seat back may be projected or retracted relative to the main seat back, upholstery on the ancillary seat back including a covering material which also covers the adjacent top portion of the main seat back, there being an excess of such cover material adapted to be folded or extended as the ancillary seat back is retracted or projected respectively, and a handle journaled at the top of the main seat back which is operably connected to the said adjustable mechanism.

4. An automobile seat comprising in combination, a main seat back, vertical guide devices carried by the main seat back, a pair of cam members associated with the vertical guide devices, means for reciprocating the cam members vertically on said guide devices, an ancillary seat back having means for operable engagement with the cam devices, whereby vertical reciprocation of the cam devices effects longitudinal reciprocation of the ancillary seat back.

5. An automobile seat comprising in combination, a main seat back, vertical guide devices carried by the main seat back, a pair of cam members associated with the vertical guide devices, means for reciprocating the cam members vertically on said guide devices, an ancillary seat back having means for operable engagement with the cam devices, whereby vertical reciprocation of the cam devices effects longitudinal reciprocation of the ancillary seat back, and longitudinally extending guide devices for guiding the ancillary seat back in its longitudinal movement.

6. An automobile seat comprising in combination, a main seat back, vertically extending guide devices carried by the back, a plate reciprocably carried by each vertical guide device, means for simultaneously reciprocating said plates vertically, each of said plates being provided with a cam slot, an ancillary seat back supported by the plates and having means engaging in the cam slots, whereby vertical reciprocation of the plates effects longitudinal reciprocation of the ancillary seat back, and means for guiding the ancillary seat back in its longitudinal reciprocable movement.

7. An automobile seat comprising in combination a main seat back, a pair of spaced vertically extending guide devices carried by said seat back, a plate reciprocably mounted on each guide device, means connecting the plates so that said plates act as a unit, a screw threaded shaft carried by the main seat back and having a handle, an interiorly threaded member on the said plate unit for engagement with the shaft, whereby the plates may be reciprocated vertically on the guide devices, each of said plates being provided with a pair of cam slots, an ancillary seat frame and studs on the said ancillary frame engaging in the said slots whereby vertical reciprocation of the plates effects longitudinal reciprocation of the ancillary seat back.

8. An automobile seat comprising in combination a main seat back, a pair of spaced vertically extending guide devices carried by said seat back, a plate reciprocably mounted on each guide device, means connecting the plates so that said plates act as a unit, a screw threaded shaft carried by the main seat back and having a handle, an interiorly threaded member on the said plate unit for engagement with the shaft whereby the plates may be reciprocated vertically on the guide devices, each of said plates being provided with a pair of cam slots, an ancillary seat frame and studs on the said frame engaging in the said slots whereby vertical reciprocation of the plates effects longitudinal reciprocation of the ancillary seat back, and means for guiding the ancillary seat back in its horizontal reciprocable movement.

9. An automobile seat comprising a main seat back, an ancillary seat back, vertical guide devices carried by the main seat back, vertically reciprocable members carried by the guide devices, means for effecting vertical reciprocable movement of the said members, horizontally extending guide devices associated with the ancillary seat back, and interengaging cam means between the vertically reciprocable members and the ancillary seat back whereby vertical movement of the said members effects longitudinal movement of the ancillary seat back.

10. An automobile seat comprising in combination a main seat back, an ancillary seat back, adjustable mechanism for the ancillary seat back, operating mechanism including a manually operable part journaled in and immobile with respect to the main seat back, whereby the ancillary seat back may be projected or retracted with respect to the main seat back, said operating mechanism being disposed at the sides of the ancillary seat back whereby the ancillary seat back in retracted position substantially abuts against the main seat back.

11. An automobile seat comprising in combination, a main seat back, an ancillary seat back, adjustable mechanism for projecting and retracting the ancillary seat back with respect to the main seat back and which is located at the sides of the ancillary seat back, upholstery on the ancillary seat back and trimming material which covers the said adjustable mechanism, and means for operating the adjustable mechanism to adjust the ancillary seat back.

12. An automobile seat comprising in combination, a main seat back, an ancillary seat back, adjustable mechanism for projecting and retracting the ancillary seat back with respect to the main seat back and which is located at the sides of the ancillary seat back, upholstery on the ancillary seat back, and trimming material which covers the said adjustable mechanism, and means occupying space in the main seat back including an immobilely supported manually operable member for actuating the said adjustable mechanism.

13. An automobile seat comprising in combination, a main seat back, an upholstered ancillary seat back, adjustable mechanism for supporting the ancillary seat back, and for retracting and projecting the ancillary seat back with respect to the main seat back, said mechanism including parts at the sides of the ancillary seat back which are covered by the upholstery whereby, in retracted position, the ancillary seat back abuts against the main seat back in telescoping relation with the said parts, and means immobilely journaled to the main seat back for actuating said adjustable mechanism.

14. An automobile seat comprising in combination, a main seat back, an ancillary seat back including a cushion applied directly to the ancillary seat back, adjustable mechanism for projecting and retracting the ancillary seat back relative to the main seat back including cam plates which lie at the sides of the ancillary seat back in telescoping relation with the ancillary seat back, operating mechanism for actuating the adjustable mechanism including a screw shaft journaled in and immobile with respect to the main seat back and provided with a handle at the top of the main seat back, said operating mechanism occupying space within the main seat back, and trimming material on the cushion and covering the adjustable mechanism in the adjacent top of the main seat back, said trimming including an excess of material adapted to be folded or extended as the ancillary seat back is retracted and projected respectively.

15. An automobile seat comprising in combination a main seat back and a seat cushion, the seat back being stationary with respect to the automobile body, an ancillary seat back arranged to be substantially co-extensive vertically with respect to the main seat back, adjustable operating mechanism for projecting or retracting the ancillary seat back from the main back both at top and bottom, and a handle journaled in the main seat back and arranged to drive the operating mechanism which projects or retracts the ancillary seat back.

16. An automobile seat comprising in combination a main seat back and seat cushion, the seat back being stationary with respect to the automobile body, an ancillary seat back including upholstering springs, projecting and retracting mechanism arranged to permit the ancillary seat to draw into substantially abutting relation with respect to the seat back or to be projected forwardly at top and bottom into a plurality of variable positions, and regulating means for driving said projecting and retracting means and holding it in adjusted position.

17. An automobile seat comprising in combination a main seat back and seat cushion, the seat back being stationary with respect to the automobile body, an ancillary seat back including upholstering springs, projecting and retracting mechanism arranged to permit the ancillary seat to draw into substantially abutting relation with respect to the seat back or to be projected forwardly substantially parallel with the main seat back into a plurality of variable positions, and a handle journaled in a fixed position in the main seat back and which is operatively connected with said projecting and retracting mechanism.

18. An automobile seat comprising in combination a main seat back and seat cushion, the seat back being stationary with respect to the automobile body, an ancillary seat back including upholstering springs, projecting and retracting mechanism arranged to permit the ancillary seat to draw into substantially abutting relation with respect to the seat back or to be projected forwardly both at top and bottom into a plurality of variable positions, a handle journaled in a fixed position in the main seat back and which is operatively connected with said projecting and retracting mechanism, and upholstery for trimming the ancillary seat and a portion of the stationary seat back and for concealing both the space between the ancillary seat back and the stationary seat back when the same are separated, and concealing also the projecting and retracting means.

In testimony whereof I affix my signature.

CARL G. CRONWALL.